Patented Sept. 30, 1930

1,777,140

UNITED STATES PATENT OFFICE

WILLY HILDEBRAND, OF GRIESHEIM-ON-THE-MAIN, GERMANY, ASSIGNOR TO THE FIRM: I. G. FARBENINDUSTRIE AKTIENGESELLSCHAFT, OF FRANKFORT-ON-THE MAIN, GERMANY

PROCESS OF PREPARING FORMALDEHYDE-PRIMARY AROMATIC AMINE CONDENSATION PRODUCTS

No Drawing. Application filed February 19, 1926, Serial No. 89,509, and in Germany February 21, 1925.

This invention relates to the manufacture of resinous condensation products from amines of the aromatic series. It is well known that numerous amines of the aromatic series, by direct reaction with formaldehyde in presence of acid or alkaline condensing agents, furnish well-crystallizing compounds which under certain conditions retain the amido-character, so, that salt-like combinations are obtained, or they are capable of being diazotized. Furthermore a process has been described (see German Patent No. 335,984) for producing an artificial resin from the anhydro-formaldehyde compound of aniline. Hereby (see the examples in the said specification) the anhydro-formaldehyde-aniline is first produced from its components (more than 1 mol. of aniline to 1 mol. of aldehyde being employed), and then the product, as a definite starting material, is further treated by heating it with or without certain additions to 130° to 140° C. during a considerable time. Finally, several cases are known in which amines only in water, without any condensing agent, on reaction with formaldehyde, yield oily or solid deposits which after separation from the solution furnish when moderately heated, molten masses of resinous matters. These cases start from α-naphthylamine, either mixed with β-naphthylamine in approximately molecular proportions or with primary amines such as aniline or toluidine.

Now I have found that with aromatic amines of every description a formation of resin satisfactory in every way can be obtained in the following manner. At first, the primary amine is made to react with at least molecular quantities of marketable formaldehyde, without first employing condensing agents of acid or alkaline character, an organic solvent for the base employed, soluble in water, as for instance alcohol, being added to the water. This reaction between amine and formaldehyde in the midst of the watery-alcoholic solution yields, as a rule, more or less viscid oils which, however either do not at all or scarcely harden at ordinary temperature. This first step of the process is followed, after separation of the solution, by a supplementary treatment of the reaction product which consists in removing by distillation in vacuo at elevated temperature the enclosed remnants of the solution and the crystallizable admixtures of by-products of the reaction which are always, although often to a very small extent, contained in the main reaction product. To remove these by-products as completely as possible the temperature must be elevated to a sufficient degree. The residue will consist, as a rule, of molten substances, the physical properties of which resemble those of colophony: brittle, clear, yellowish to brownish masses of conchoidal fracture and of considerable solubility in many of the usual volatile organic solvents for resins (except alcohol). The products obtained are chemically quite inert against water and alkalies. The resin separates from its solutions on a carrier such as glass, porcelain or metal in the form of a coating as clear as glass, brilliant, air-proof and, in some cases, light-proof.

If the separated primary reaction products are solid, they may be subjected to a supplementary treatment in the same manner as the liquid products, or in certain cases they need only be dried.

The point of emollescence of the resinous masses which are obtainable according to the present invention may be adjusted at will, for instance, by selecting the bases accordingly. For this selection, not only primary and secondary amines of the aromatic hydrocarbons, but also their substitution products, for instance, halogenized primary and secondary amines, come into consideration, either as individuals or in the form of the technically obtainable mixtures of isomers. Or I may adjust the emollescence-point by varying the proportions of the base and the formaldehyde, an excess of the aldehyde generally effecting an increase of the fusion point of the final product. Finally, the amount of the crystallizable substances to be removed by the treatment in vacuo may be advantageously influenced by varying the conditions of working in the reaction between the amines and the formaldehyde (variation of the temperature and the duration of the treatment).

The most favorable conditions are to be ascertained by experiment in each single case.

*Example 1*

107 parts of o-toluidine are dissolved in equal parts of alcohol of 90 per cent by weight and then stirred with 100 to 120 parts of formaldehyde of 30 per cent (1 to 1.2 molecule to 1 molecule of the base) during several hours at moderately elevated temperature (30° to 80° C.). The reaction product separates as an oil which is separated from the watery alcohol. The vessel is evacuated and the temperature gradually increased to 180° C., whereby the adhering remnants of alcohol, water, o-toluidine base and indefinite crystalline by-products are removed. A molten resin remains, the output amounting to 90 per cent of the toluidine employed. After pouring out, for instance into molds, the resin solidifies to a colophony-like mass showing an emollescence-point of 60° C. The emollescence-point may be increased by employing larger quantities of formaldehyde.

*Example 2*

200 parts of aniline are dissolved in 320 parts of alcohol of 94 per cent, and 225 parts of formaldehyde of 30 per cent (=1.05 molecule) are added while stirring for 1 to 1½ hours, the temperature being kept below the boiling point. A resin forming a thin liquid is precipitated, the separation of which is completed by continued boiling. The product is further treated as described in Example 1. A clear, yellow resin showing a solidification-point of about 50° C. is obtained.

*Example 3*

30 parts of a technical mixture of isomeric chlorotoluidines, 60 parts of alcohol of 90 per cent, 30 parts of formaldehyde of 30 per cent (1.4 molecule per 1 molecule of the base) are treated as described under 1. After separation of all volatile parts from the primary oil a resin remains showing an emollescence-point of about 30° C.

Example 4

To 150 parts of α-naphthylamine dissolved in 300 parts of a water solution containing 24 per cent of alcohol, 120 parts of formaldehyde of 30 per cent (=1.15 molecule) are added at boiling temperature during 1 to 1½ hours. The mixture is kept boiling during 6 to 8 hours. A viscid, thick resin is separated which on cooling solidifies. The product is dried. The point of solidification is about 125° C.

*Example 5*

150 parts of β-naphthylamine, dissolved in 450 parts of alcohol of 94 per cent are treated at boiling point with 120 parts of formaldehyde of 30 per cent (=1.15 molecule) as described in the foregoing example. A dark, viscid resin results which on melting in vacuo yields a red resin showing a freezing point of 80° C.

Further experiments have shown that the addition of small quantities of a salt of the primary amine employed exerts a surprisingly great influence on the course of the reaction. Under these conditions not only practically theoretical outputs in view of the amine employed may be obtained (resulting in the absence of the by-products mentioned above) but also products are obtained which are advantageously distinguished from the products referred to above by a considerably increased fusion-point. Whilst, for instance from a toluidine without additions a resin having an emollescence-point of about 60° C. is obtained, now, by employing the said addition, a resin showing an emollescence-point of about 90° C. may easily be obtained.

Furthermore I have found that in presence of the salt the process in many cases may be carried out in pure watery solution so that the organic solvents soluble in water which were provided before may be dispensed with.

Accordingly the process may be modified in such a manner that the formaldehyde is added in the presence of a small quantity of a salt of the amine to the above-mentioned amine either dissolved in alcohol or suspended in water. For this purpose the amino-salt or simply the corresponding quantity of the organic or inorganic acid may be added from the beginning, or the formaldehyde may be mixed with the required quantity of acid. The same applies to the case of the amine running into the formaldehyde.

The quantity of the amine which, owing to the addition of acid, may be considered to be present in form of the corresponding salt, is of decisive importance for the final product, that is to say in a different manner according to the character of the base employed. The first portions added may substantially favorably influence the more quantitative course of the resin formation, the by-products disappearing more and more; the further portions cause the increase of the fusion-point of the final product. For instance, in the case of o-toluidine and the presence of its formate or hydrochloride the following facts have been ascertained: The output is increased, until about 2 to 3 per cent of the amine are present in the form of salt; the emollescence-point is further increased to about 90° C., until about 10 per cent of the amine are present in the form of salt.

Example: 60 kgs. of toluidine are made to react with 65 kgs. of formaldehyde of 30 per cent, containing 1.0 kg. of formic acid. This quantity of acid is sufficient to transform 2.32 kgs. of toluidine to the amino salt. In this case $\frac{2.32}{60} = 3.9$ per cent of the toluidine are denoted to be present in the form of amino salt.

With other bases, for instance with aniline, the output and the emollescence-point are simultaneously increased, even with very low percentages of salt, as shown by the following table:—

Ingredients: 200 parts of aniline, 225 parts of formaldehyde of 30 per cent (=1.05 molecule) containing 0.07 per cent of formic acid, 320 parts of alcohol of 94 per cent.

*Additions*

| Formic acid | Per cent of the amine in form of salt | Output parts | Emollescence-point |
|---|---|---|---|
| 0.0 | 0.16 | 183 | 50° |
| 0.1 | 0.26 | 191 | 56° |
| 0.2 | 0.36 | 195 | 62° |
| 0.5 | 0.66 | 201 | 70° |
| 1.0 | 1.17 | 207 | 73° |
| 2.1 | 2.28 | 207 | 77° |

The limits of the influence exerted by the percentage of salt are often indistinct and differ individually according to the different amines or mixtures of amines or the different salts employed. They must be ascertained by experiments. Of course, with the same effect a salt of another amine may also be added.

The water or water-alcoholic solutions may be reused for a further operation, if desired, or they may be worked up in suitable way.

Finally, with the same percentage of salt the emollescence-point of the resin may often, although not generally, be further increased by increasing the amount of the aldehyde beyond the molecular proportion, for instance to 1¼ to 1½ molecule; for instance, in the above described example referring to o-toluidine, emollescence-points from 95 to 100° C. may be attained. In this way, in addition to the possibilities mentioned above, the variation of the percentage of the formaldehyde forms a reliable means for determining the emollescence-point of the desired resin within definite limits of temperature.

A further possibility of variations results from a variation of the temperature: when the reaction is carried out at the boiling-point of the watery phase or—in a closed vessel—at a higher temperature, a product, having the same emollescence-point, and approximately the same output, may be attained with a lower percentage of salt or a smaller addition of acid than when working at temperatures below the boiling point. An especial consumption of heat is not required, especially when the process is carried out on a larger scale, as the exothermic character of the reaction permits of maintaining the elevated temperature by regulating the supplying velocity of the one reaction component, preferably of the acidulated aldehyde.

As to the solubility of these resins having a higher fusion point, the same remarks are applicable to them as to the resins having a lower emollescence-point, as far as the products have been made in watery-alcoholic solution; however, the resins obtained from watery solutions often display a different character.

The resins having a higher melting-point, when made in the presence of amino-salt, differ, in physical respects, from the resins produced only from amine and aldehyde by somewhat greater hardness and higher electric insulating capacity.

The resin-like masses produced according to the present invention may be employed, either separately or in mixtures made according to the desired emollescence-point, as substitutes for genuine resins in the various branches of industry, or they may be employed with the admixture of genuine resins.

For instance, they are well qualified, especially by their insensibility to alkali, in the dyer's art, for instance for "batik" work, to serve as resists when dyestuffs are employed in an alkaline medium. In contradistinction to the genuine resins which are affected by alkalies, the new resins made according to my present invention yield, with resist prints, designs showing entirely sharp outlines. After printing, the resins may be dissolved and removed by organic solvents or weak acids, but in the simplest way, especially as far as the resins having an emollescence-point below about 60° C. are concerned, by treating them with hot water, by which the resin may be rinsed off from the fiber.

I claim:—

1. The process of producing resin-like condensation-products from primary amines of the aromatic series, which consists in making the amine and commercial formaldehyde react in presence of water-soluble organic solvents for the amine, at a temperature which is at least equal to the boiling-point of the watery phase, separating the reaction product and then heating the separated reaction product in vacuo to distill off the volatile by-products.

2. The process of producing resinlike condensation-products from primary amines of the aromatic series which consists in making the amine and commercial formaldehyde react in the proportion of one molecule of amine to at least one molecule of formaldehyde and in presence of water soluble organic solvents for the amine, separating the reaction product and then heating the separated reaction product in vacuo to distill off any volatile by-products.

3. The process of producing resinlike condensation-products from primary amines of the aromatic series which consists in making the amine and commercial formaldehyde react in the proportion of one molecule of amine to at least one molecule of formaldehyde and in presence of water soluble organic solvents for the amine and further in presence of an amine salt in a quantity not exceeding 10% of the free amine, separating the reaction product and then heating the separated reaction product in vacuo to distill off any volatile by-products.

4. The process of producing resinlike condensation products from primary amines of the aromatic series which consists in making the amine and commercial formaldehyde react in the proportion of one molecule of amine to at least one molecule of formaldehyde and in presence of water soluble organic solvents for the amine and further in presence of an amine salt in a quantity not exceeding 10% of the free amine and produced during the reaction by adding formaldehyde containing the corresponding quantity of an acid, separating the reaction product and then heating the separated reaction product in vacuo to distill off any volatile by-products.

In testimony whereof I affix my signature.

WILLY HILDEBRAND.